No. 760,681. PATENTED MAY 24, 1904.
E. CAMPBELL.
MOLD.
APPLICATION FILED MAY 14, 1903.
NO MODEL.
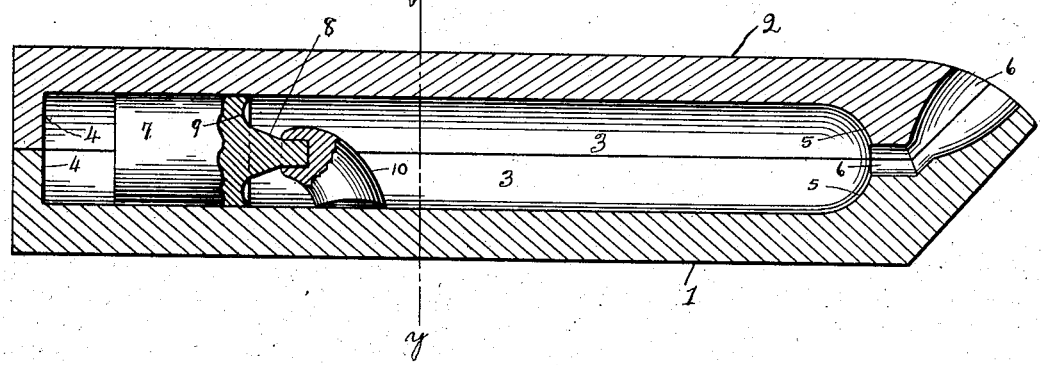
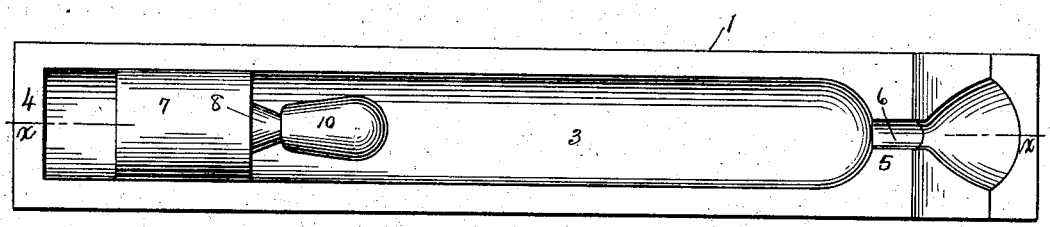
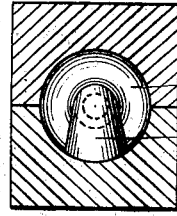
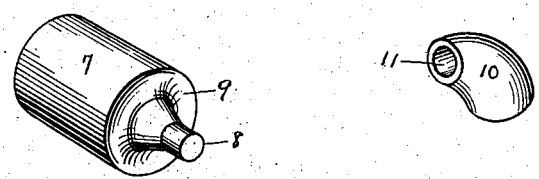
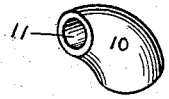
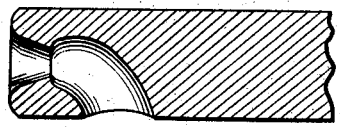
WITNESSES:
INVENTOR
Edwin Campbell
BY
Edward P. Thompson
ATTORNEY No. 760,681. Patented May 24, 1904.

UNITED STATES PATENT OFFICE.

EDWIN CAMPBELL, OF EAST ORANGE, NEW JERSEY.

MOLD.

SPECIFICATION forming part of Letters Patent No. 760,681, dated May 24, 1904.

Application filed May 14, 1903. Serial No. 157,153. (No model.)

*To all whom it may concern:*

Be it known that I, EDWIN CAMPBELL, a citizen of the United States of America, and a resident of East Orange, in the county of Essex and State of New Jersey, have invented certain new and useful Improvements in Molds, of which the following is a specification.

My invention relates to molds for sash-weights, and has for its object to produce a mold of this character which can be used over and over indefinitely, and especially to produce a mold by which the eye can be cast in a sash-weight without the necessity of having to make a new core each time the mold is used, as is the case with sand molds.

Another object in view is to secure a mold which is adjustable, so that sash-weights of different lengths, and consequently of different weights, may be cast in the same mold. For these purposes I provide a mold proper consisting of two mating halves, and within this mold proper I insert an adjustable end piece having a stud projecting centrally from its inner end. A tapered and curved core-piece has a recess in its smaller end, which recess receives the end of said stud, the larger end of the core-piece being in contact with and conforming in shape to the inner surface of the side of the mold proper.

My mold is constructed entirely of metal, preferably cast-steel, a mold of this kind being known as a "chill."

For more detailed description reference will now be had to the accompanying drawings.

Figure 1 is a vertical longitudinal central section of the complete device, being on the line *x x* of Fig. 2. Fig. 2 is a plan view looking in a downward direction compared to Fig. 1, the top piece of the mold being removed. Fig. 3 is a section on the line *y y* of Fig. 1 viewed from the right. Fig. 4 is a perspective detail view of the adjustable end piece. Fig. 5 is a perspective detail view showing the removable core-piece. Fig. 6 is a fragment in section of the upper end of a sash-weight such as my improved mold is intended to produce.

1 represents the bottom section of the mold, upon which is removably fitted the top section 2. Each section 1 and 2 is hollowed out, so that when the two are joined there is an interior cylindrical space 3 between them. Each section 1 2 has end walls 4 5, the ends 4 being at right angles to the length of the sections 1 2 and the ends 5 being interiorly rounded, gradually merging into the inner side surfaces of the sections 1 and 2. A pouring-opening 6 is formed half in each of the mating sections 1 2 and communicates with the interior space 3 at the center of its rounded end.

Contained within the interior space 3 is a cylindrical end piece 7, which is slidingly adjustable lengthwise of said space. Projecting from the center of the inner end—that is, the end against which the molten metal flows when admitted to the mold, therefore the end next to the pouring-opening 6—of the end piece 7 is the stud 8, the lower portion of said stud tapering upward and the upper portion thereof being cylindrical. The end piece 7 has on its end an annular groove 9, surrounding the base of the stud 8, the bottom of said groove being rounded and its inner side gradually merging into the base of the stud 8 and its outer side forming an acute angle with the sides of the end piece 7.

10 is a core-piece, which is both tapered from one end to the other and curved throughout its length. The larger end of the core-piece 10 has the same curve as and fits against the cylindrical interior surface of the sections 1 and 2, and the smaller end of said core-piece has the recess 11, which detachably receives the cylindrical portion of the stud 8. The core-piece 10 is adjustable with the end piece 7 to different positions along the space 3. The end piece 7 and the core-piece 10 are both removable from the mold proper and detachable from each other, and they may occupy any radial position within the cylindrical interior 3, this being immaterial; but for the sake of stability I place the core-piece 10 with its larger end downward, as shown.

In the operation of my improved mold the end piece 7 and core-piece 10 are placed in position with the stud 8 entering the opening 11 and at a distance along the space 3 from the end 5, according to the length of sash-weight desired to be cast. The casting is removed from the mold by lifting off the top section 1.

On account of the taper of the stud 8 the end piece 7 is easily detached from the casting; the end of said stud at the same time slipping out of the recess 11 in the core-piece 10. As the core-piece 10 is tapered throughout its length, it readily drops out of the eye of the cast sash-weight. On account of the smaller end of the core-piece 10 being of greater diameter than the upper tapered portion of the stud 8 a form of eye is produced in the casting which will retain a cord that is knotted at the end. As the base of the stud 8 gradually merges into the groove 9, sharp corners in the product which would cut the suspending-cord are avoided. The result of the acute angle which the groove 9 forms with the sides of the end piece 7 of the interiorly-rounded ends 5 and of the pouring-opening 6, entering the mold at the center of the interiorly-rounded end, is to preclude the formation on the product of outwardly-projecting corners or excrescences which might cause trouble in use by catching in the raceway or by destructive and unnecessary friction therein. The function of the end walls 4 is merely to prevent the accidental dropping out of the end piece 7 and core-piece 10 in handling the mold. The function of the cylindrical portion of the stud 8 is to retain the core-piece 10 steady and in perfect alinement in relation to the end piece 7, as if the outer end of the stud 8 and the opening 11 were tapering the said core-piece would not be held from toppling over out of place. The cylindrical pin 8 will not readily slip from the hole 11 under a twisting or side strain, because its parallel sides obtain a firm bite against the perpendicular sides of the said hole, whereas in the case of a tapering pin and hole the force of the bite would be lessened and under a side strain a cam action would be set up tending to displace the pin from the hole. Also in order to increase the firmness of its hold preferably the cylindrical portion of the pin entering the hole is of greater length than diameter. The end piece 7 and core-piece 10 can also be used in sand molds independently of the chill-mold described and composed of the sections 1 and 2, and I have so used them with complete success.

I claim as my invention—

1. A chill-mold for sash-weights consisting of the combination of a mold proper having a pouring-opening at one end thereof, an adjustable end piece contained within said mold proper and forming its other end, an axial stud projecting from the inner end of said end piece, and a core-piece having an opening detachably receiving the end of said stud, said core-piece being adjustable with said end piece.

2. In a chill-mold for sash-weights, the combination of a mold proper, an adjustable end piece contained within said mold proper and forming one end thereof, an axial stud projecting from the inner end of said end piece, and a core-piece having an opening detachably receiving the end of said stud, said core-piece being adjustable with said end piece.

3. A chill-mold for sash-weights consisting of the combination of a mold proper having a pouring-opening an adjustable end piece contained within said mold proper and forming one end thereof, a stud projecting from the center of the inner end of said end piece, the lower portion of said stud tapering upward from the base, and a curved and tapered core-piece having a recess in its smaller end detachably receiving the end of said stud, the larger end of said core-piece conforming to and contacting with the inner side surface of said mold proper.

4. A chill-mold for sash-weights consisting of the combination of a mold proper having a pouring-opening, an adjustable end piece contained within said mold proper, and a tapered and curved core-piece, the smaller end of said core-piece contacting with the center of the inner end of said end piece and the larger end of said core-piece conforming to and contacting with the inner side surface of said mold proper, said core-piece being movable with said end piece.

5. A chill-mold for sash-weights consisting of the combination of a mold proper having a cylindrical interior space and composed of two halves detachably fitted together longitudinally, one end of said interior space being rounded, said mold proper having a pouring-opening at the center of said rounded end, and having its other end closed, an adjustable end piece fitting the interior of said mold proper, an axial stud projecting from the inner end of said end piece and integral therewith, the lower portion of said stud tapering upward and the upper portion thereof being cylindrical, said end piece having an annular groove having a rounded bottom, said groove surrounding and merging into the tapered base of said stud and on its outer circumference forming an acute angle with the sides of said end piece, and a curved and tapered core-piece having a recess in its smaller end, said recess detachably receiving the cylindrical portion of said stud, the larger end of said core-piece conforming to and contacting with the inner side surface of said mold proper, said core-piece being adjustable with said end piece.

In testimony whereof I hereunto sign my name and affix my seal this 12th day of May, 1903.

EDWIN CAMPBELL. [L. S.]

Witnesses:
L. E. HICKS,
ANNA R. McCOLE.